US008157966B2

(12) United States Patent
Parviainen et al.

(10) Patent No.: US 8,157,966 B2
(45) Date of Patent: Apr. 17, 2012

(54) APPARATUS FOR REMOVING GAS IN CONNECTION WITH A PAPER MACHINE OR CORRESPONDING

(75) Inventors: Jouni Parviainen, Klaukkala (FI); Ari Pelkiö, Savonlinna (FI); Ari Vilpponen, Savonlinna (FI)

(73) Assignee: Andritz Oy, Helsinki (FI)

( * ) Notice: Subject to any disclaimer, the term of this patent is extended or adjusted under 35 U.S.C. 154(b) by 0 days.

(21) Appl. No.: 12/594,761

(22) PCT Filed: Apr. 2, 2008

(86) PCT No.: PCT/FI2008/000048
§ 371 (c)(1),
(2), (4) Date: Jan. 15, 2010

(87) PCT Pub. No.: WO2008/119872
PCT Pub. Date: Oct. 9, 2008

(65) Prior Publication Data
US 2010/0126686 A1    May 27, 2010

(30) Foreign Application Priority Data

Apr. 3, 2007   (FI) ..................................... 20070262

(51) Int. Cl.
*D21F 1/66* (2006.01)
(52) U.S. Cl. ....................... 162/264; 162/380
(58) Field of Classification Search ................. 162/190, 162/254, 380, 381; 95/246; 96/155, 157, 96/193
See application file for complete search history.

(56) References Cited

U.S. PATENT DOCUMENTS

| 3,206,917 A * | 9/1965 | Kaiser et al. | 95/248 |
| 5,868,905 A * | 2/1999 | Graf et al. | 162/380 |
| 6,416,632 B1 * | 7/2002 | Kirjasniemi et al. | 162/380 |

FOREIGN PATENT DOCUMENTS

| DE | 199 61 545 | 6/2001 |
| GB | 755 973 | 8/1956 |
| WO | WO 97/15717 | 5/1997 |
| WO | WO 00/11265 | 3/2000 |
| WO | WO 02/22946 | 3/2002 |

OTHER PUBLICATIONS

International Search Report mailed Jul. 28, 2008.

* cited by examiner

*Primary Examiner* — Eric Hug
*Assistant Examiner* — Peter Chin
(74) *Attorney, Agent, or Firm* — Nixon & Vanderhye P.C.

(57) ABSTRACT

An apparatus in connection with wire water treatment in the approach system of a paper machine, board machine or corresponding web formation machine, which apparatus includes a deaeration tank connected to devices for generating a vacuum inside the deaeration tank. At least one wire water feed pipe extends into the tank, which pipe opens into a vacuum space above the liquid surface level in the tank. A wire water discharge duct is connected to the bottom part of the tank. The feed pipe extends above the liquid level in the tank so that the wire water overflows the edge of the feed pipe onto the liquid level in the tank and the wire water discharge conduit extends downward and is connected to a pump.

17 Claims, 4 Drawing Sheets

APPARATUS FOR REMOVING GAS IN CONNECTION WITH A PAPER MACHINE OR CORRESPONDING

CROSS RELATED APPLICATIONS

This application is the US national phase of international application PCT/FI2008/000048 filed 2 Apr. 2008 which designated the U.S. and claims benefit of Finnish Patent Application No. 20070262 filed 3 Apr. 2007, the entire contents of these applications are hereby incorporated in their entireties by reference.

Deaeration of stock and wire water is important in paper making, especially with high-speed paper machines producing printing and writing paper grades. Deaeration is essential also for other paper grades and for fast board machines when producing products with low basis weight using recycled and waste paper raw materials. The air content of stock and wire water has increased gradually and simultaneously with increased recycled paper and waste paper content of stock. The present invention relates to an apparatus in connection with wire water treatment in the approach system of a paper machine, board machine or corresponding web formation machine, which apparatus comprises a deaeration tank. This tank is connected to devices for generating vacuum inside the deaeration tank. At least one wire water feed pipe extends into the tank, which pipe opens to a vacuum space above the liquid level in the tank. A wire water discharge conduit is connected to the bottom part of the tank.

The present deaeration technology for complete air-removal comprises a conventional deaeration system operating under vacuum and positioned at an elevated level, mainly consisting of a deaeration tank with a barometric overflow. Therefore the deaeration apparatus is located above the paper machine. Thus, long pipelines are inevitable for distributing stock and water into and from the deaeration system, and also to a stock cleaning apparatus, if such is included in the system. The best known of said deaeration systems among the experts in the field are systems in accordance with the trademark Deculator® (Andritz).

Deaeration tanks are large tanks, into which the fiber suspension is lead in form of dilute mixture. The operating principle of the tank is to boil the fiber suspension under vacuum and thus separate the gas to a so-called gas space and to remove this gas from the tank. The suspension being lead to the paper machine is discharged via an opening in the bottom of the tank, whereby the idea naturally is to discharge from the tank as gas-free fiber suspension as possible. For maximizing the gas-removal efficiency of the tank, a vacuum is pumped into the tank by means of a vacuum pump, whereby the gas is withdrawn from the tank via the vacuum pump. The gas-removal efficiency is further enhanced by introducing the stock and liquid to be treated via nozzles above the liquid level in the tank and by making it impinge to e.g. the ceiling of the deaeration tank, whereby gas possibly present in the form of bubbles in the liquid being treated is separated before the liquid gets into contact with the liquid already present in the tank. Gas can be separated from wire water in the same deaeration tank with the stock or in a separate tank, such as shown e.g. in FI patent 100950 and later in FIGS. 6 and 7.

The latest trend relates to some extent to paper machine approach systems with a smaller volume, in which air is removed from wire water only. This partial deaeration may be adequate in certain applications, which require lower investments. Deaerated water is introduced into pumps and stock cleaners for consistency adjustment and also directly to the headbox for final consistency profiling.

Thick stock with air represents approximately 20% by volume (10-25%) of the total flow to a headbox at a headbox stock consistency of 1.0%. The total air in thick stock may vary between 1.0% and 10% by volume. But the total air in the approach system is also dependent on the air content of the wire water and the proportions of the thick stock and the wire water flows that are mixed in a primary fan pump. The amount of air in the headbox feed can be easily calculated based on the proportions of flow rate rates and air contents.

Typically in conventional approach systems with a Deculator® deaeration apparatus, all air has been removed from thin stock (thick stock mixed with wire water in a first fan pump) before pumping into the headbox. Since late 1990s, the increasing number of headbox replacements has been based on consistency profiling (CP) type of headbox technology. In most cases, dilution wire water to the CP headbox is deaerated and the wire water is screened before the headbox. The amount of dilution water represents about 8-20% of the slice flow. Adding a deaeration apparatus to a consistency profiling dilution water loop ensures complete deaeration of stock in the headbox, if also the main line is provided with a deaeration system. If the dilution water is taken into the headbox without removing gas from the stock, the proportional amount of air is present in the slice flow. The amount of air in the slice flow may easily exceed the requirements of the paper machine.

In some applications air-removal from the dilution wire water only can be considered adequate. In this case the remaining proportional amount of air in the slice flow originates from thick stock, if air has not been removed. Acceptable total air content in the headbox is to be based on a guarantee value defined by the supplier of the machine, which enables problem-free runnability of the machine and good paper quality.

The following headbox deaeration guarantee values are references from installed paper machines: one paper machine supplier has defined an air-content of 0.2% for an LWC application, another machine supplier 0.3% for newsprint application and 0.7% for a board machine.

Increased use of recycled raw material in the production of paper and board has also lead to higher air-contents in paper machine approach systems. In fast multi-layer board machines and also in slower testliner and fluting board machines using OCC and MOW raw materials, the feed pulp usually contains air in the amount of 5-8%. Also in newsprint applications using recycled raw material, air contents of 5-10% have commonly been measured in the approach systems before deaeration. Without deaeration excessive air may have a detrimental effect on machine runnability and paper quality.

Usually the wire water is lead by means of a so-called wire water flume from the wet end of the paper machine into the wire pit. Bigger air bubbles rise onto the water surface when travelling in long wire water flumes, but smaller air bubbles below the surface travel entrained in the water forward to the bottom part of the wire pit and to a pump. Some silos may be provided with vent vapor removal or a slight vacuum connected to an outlet arranged in the cover of the wire pit for removing air. In that case, however, the system does not ensure adequate deaeration of the wire water.

An object of the present invention is to eliminate the above problems and provide for an economical apparatus for deaeration of wire water.

For reaching these objectives, the present invention relates to an apparatus in the treatment of wire water in the approach system of a paper machine, a board machine or a corresponding web formation machine, which apparatus comprises a deaeration tank, which tank is connected to devices that generate vacuum inside the deaeration tank and at least one wire water feed pipe extends into said tank, which feed pipe opens into a vacuum space above the liquid level in the tank, and a wire water discharge duct is connected to the bottom part of the tank. A characteristic feature of the invention is that at least one feed pipe extends above the liquid level in the tank to the vacuum space so that the wire water flows over the edge of the feed pipe into the vacuum space and onto the liquid level in the tank and that the wire water discharge conduit extends downward and is connected to a pump. Preferably the deaeration tank is located at the machine level and the pump connected to the discharge duct is located at the basement level, whereto the discharge duct extends. The wire water flows into the deaeration tank by means of vacuum. Said at least one feed pipe is connected via a transition pipe to a wire water source, the level of which is preferably higher than the discharge edge of the feed pipe.

Partial deaeration consumes less energy and the deaeration system is adjustable and flexible for different productions. It requires less piping, thus reducing the volume of the approach system. An elevated conventional deaeration will remain as an alternative system when complete deaeration, i.e. also stock deaeration, is required.

A characteristic feature of the invention is that the operations of the wire water tank and the deaeration process are combined in one and the same apparatus in the vicinity of the paper machine on a small floor area. The present invention provides for a further developed arrangement. Energy consumption is well regulated and lower than in known systems.

In some applications complete deaeration is still essential, but partial deaeration can be applied in systems, where air-removal is advantageous, but complete deaeration is not required. The main principle of the present invention is to collect the wire water and possibly former water in a deaeration tank, which is under vacuum. The water is lead from the paper machine via transition pipes into the deaeration tank for deaeration. The number of the transition pipes is one or more depending on the wire water flow rate. In the deaeration principle according to the invention, impinging of wire water is not required as in stock deaeration, where the air bubbles bound in the fibers must be broken. Therefore in the present invention the feed into the deaeration apparatus can be relatively calm; the wire water only flows as overflow over the edge of the feed pipe or pipes onto the liquid surface in the tank. The upper edge of the feed pipe must be above the liquid level in the deaeration tank and preferably lower, typically about 0.3-0.5 m lower than the surface of the wire water source, i.e. the inlet surface, such as e.g. the water discharge port of the paper machine. By means of a feed pipe above the liquid level, the water is forced in the deaeration apparatus into the vacuum space above the liquid level in the deaeration tank for preventing the air bubbles from submerging in the liquid and for ensuring deaeration before the water from the feed pipe falls onto the liquid surface.

The arrangement according to the invention differs from conventional arrangements in view of location and operating principle; impinging of liquid is not required, energy consumption is decreased, the feed flow is assisted by gravity and vacuum, the inflow is calm as well as the liquid surface, and the vacuum is adjustable. In accordance with the invention, no submerging of air bubbles occurs, unlike in other systems. When the air bubbles submerge, their removal is more difficult than in case of bringing them into the vacuum space. The apparatus according to the invention for wire water deaeration uses vacuum up to the maximum physical limits. Other systems use insufficient vent vapor removal or a slight vacuum connected to an outlet conduit in the cover of the wire water tank, and if the deaeration apparatus is provided with an overflow, it can be circulated to the feed side of the deaeration apparatus.

In the invention, one or more control valves are arranged in the transition pipes between the point where wire water is formed and the feed of the deaeration apparatus for controlling the surface at the point where the water is formed. The feed of the deaeration apparatus is under vacuum, which pulls the water into said apparatus. On the other hand, between the feed point of the wire water and the deaeration tank, one or more control valves may be provided in the transition pipe or pipes for regulating the surface in the deaeration tank. The wire water source for a deaeration tank is typically wire water discharge, or wire water silo (wire pit) of a web formation machine, such as a paper machine.

The system for deaeration of wire water according to the invention is preferably located adjacent to the paper machine at the machine level, which allows the shortest possible transition pipes. The transition pipes may be connected to the deaeration tank from any direction. For example, a twin-wire former may be provided with a wire water discharge before the headbox and another wire water discharge after the headbox. The number of the transition pipes depends on the wire water flow rates. The height of the drop leg of the deaeration tank is regulated based on the construction of the building from the basement level to the machine level. The minimum height of the apparatus can also be determined based on deaeration and vacuum requirements. The invention is flexible in view of construction and it can be applied to new and existing systems without capacity limitations.

The system operates under vacuum, which is created e.g. by means of a liquid ring vacuum pump. The vacuum system is a one-pump system, which is provided with an adjustable speed drive for adjusting the vacuum level. In case of vacuum pump failure the system may be provided with a stand-by pump connected in parallel or a bypass line to a common suction pipe line of the paper machine, if additional capacity is available.

The vacuum system discharges into atmospheric pressure, so that it can be located at any elevation in the building. When the approach system comprises pressurized reject hydrocyclones, they can be located either at the basement level of the building or at the machine level.

When the system for deaeration of wire water is applied in the consistency profiling dilution water loop in an existing paper machine approach system, the transition pipe is connected below the liquid level in an existing wire water silo. Also in this case there is a height difference between the liquid levels for decreasing flow resistances by means of gravity. The vacuum withdraws water through a level control valve into the vacuum space of the deaeration tank, and the discharge pipe of said tank is connected directly to the dilution water feed pump of the headbox. The system according to the invention requires a single pump only, whereas a conventional deaeration apparatus requires two pumps; a dilution water feed pump from the wire water silo to the deaeration apparatus and a headbox dilution water feed pump from the deaeration apparatus to the headbox.

The construction according to the invention is preferably based on a vertical cylindrical type of tank, which preferably has a conical upper end and a conically converging part at the bottom portion, which is associated with a wire water discharge duct, a drop leg. The upper part may also be convex. In addition to the drop leg, there may be other necessary discharge conduits, which are connected to the drop leg or the converging part below the deaeration apparatus. The retention time in the tank is important for air-removal. An adequate retention time has been calculated for the liquid in the tank, which enables the bubbles to exit via the surface into the vacuum space.

Advantages of the present invention include:
an easily adaptable construction
flexible layout
reduced costs of the paper machine approach system and the deaeration system
sufficient deaeration efficiency with reduced energy consumption
reduced volume of the approach system
decreased amount of piping
shortened changeover time during paper grade changes
elimination of dilution water feed pump to the deaeration tank
enables a one-pump system also in the main line The invention is described in more detail with reference to the accompanying figures, of which FIG. 1 illustrates in detail a tank in accordance with the present invention for removing air from wire water;

Figure 6:
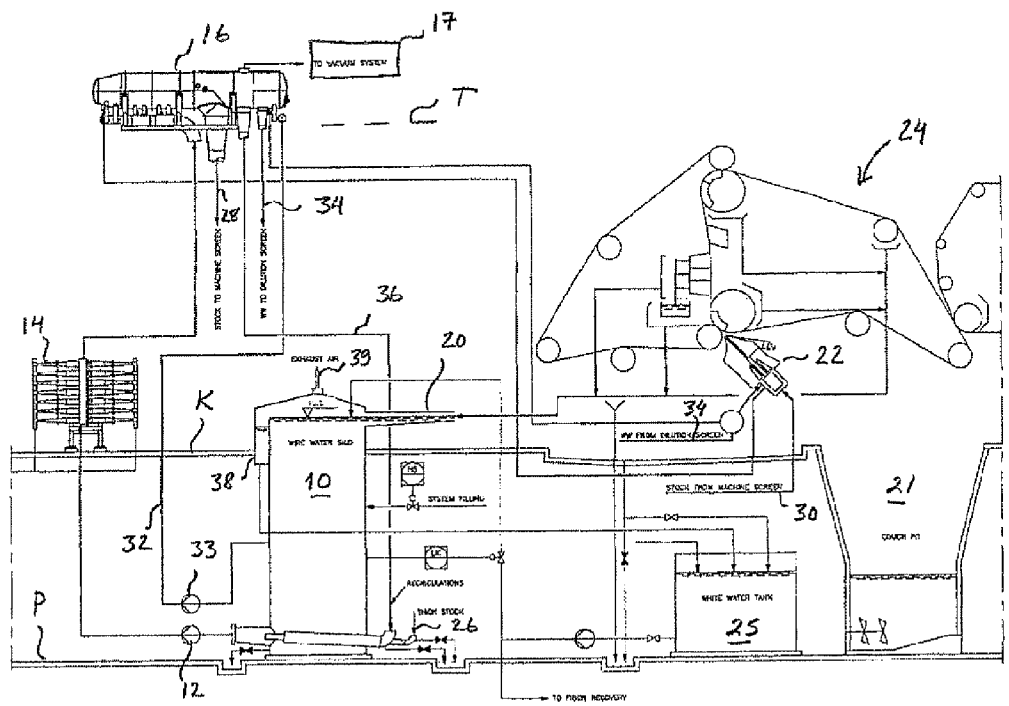
FIG. 6 illustrates a prior art solution for removing air both from stock and wire water in an elevated deaeration tank known per se.

The prior art paper machine approach system illustrated in FIG. 6 comprises a wire water silo, i.e. wire pit 10, a fan pump 12, a centrifugal cleaning plant 14 with several stages, a deaeration tank 16 with its vacuum devices 17, a paper machine 24 and a paper machine headbox 22 and wire water collection flumes 20. Said components are positioned in connection with the paper machine 24 and arranged to operate as follows. The wire waters are collected in the wire water silo, which in prior art systems is usually located at the basement level P of the mill, as shown in the figure, and into which the fiber material (thick stock) used in paper-making, which may be comprised of fresh stock, secondary stock and/or broke, and the fillers are dosed from the machine chest via flow path 26. By means of the fan pump 12 also located at the basement level P of the mill, said paper-making stock and required dilution water from the wire water silo 10 is pumped to a centrifugal cleaning plant 14 usually located at the machine room floor level K, (the location level of the paper machine with its headbox). The paper-making stock accepted in the centrifugal cleaning plant 14 is conveyed further by means of pressure created by said mixing pump 12 and by the vacuum in the dearation tank 16 into the dearation tank 16, which is located at a level T above the machine room floor level. The deaeration tank 16 typically comprises an overflow, which maintains constant liquid level of the paper-making stock in the tank. From the dearation tank 16 the essentially gas-free paper-making stock, wherefrom gas has been removed as thoroughly as possible by means of vacuum devices 17, flows from conduit 28 to a headbox feed pump (not shown) located at the basement level of the mill, which pump further pumps the paper-making stock to a headbox screen (not shown) that accepts paper-making stock flows from conduit 30 into the headbox 22 of the paper machine.

In the deaeration tank 16, air is removed also from wire water, which is pumped by means of a pump 33 from the wire water silo 10 via line 32 into the other end of the tank 16. The wire water is lead into the deaeration tank via several feed pipes extending thereto so that the wire water is made to impinge to the ceiling of the tank. Under the effect of the impingement and the vacuum created by the vacuum devices 17 gas is separated from the wire water. The deaerated wire water is lead from line 34 by means of a pump (not shown) via a screen into the headbox 22, where the final consistency adjustment (profiling) of the stock to be fed to the wire is carried out. The overflow fractions are circulated from the deaeration tank via line 36 to fan pump 12.

Figure 7:
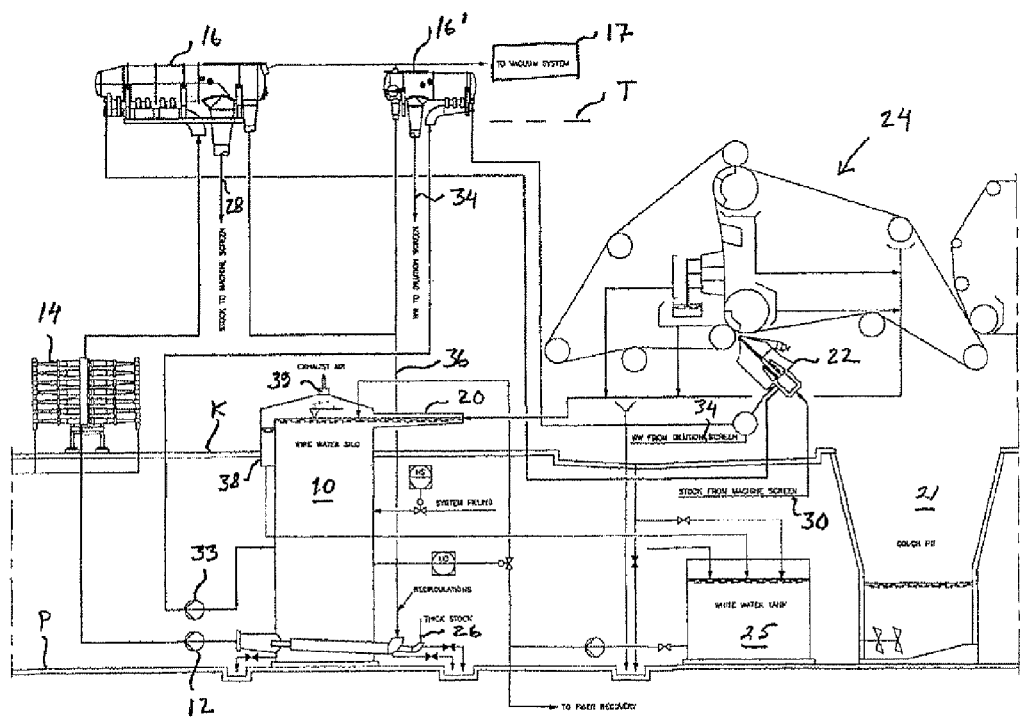
FIG. 7 illustrates a prior art solution for removing air both from stock and wire water in elevated separate deaeration tanks known per se.

The stock and the wire water are treated in the coupling of FIG. 6 in a common gas space in the deaeration tank 16, but as is known they can also be treated in accordance with FIG. 7 in separate deaeration tanks 16 and 16', which have a similar construction and are located at a level T above the machine level.

FIG. 6 also shows a prior art wire pit solution well known per se. it comprises a vertical cylindrical vessel 10 located at the basement level of the mill, in the upper part of which one or more wire water flumes 20 are arranged, through which the wire waters flow into the wire pit essentially onto the surface layer of the wire water already present in the pit. The liquid level in the wire pit is maintained constant by means of an overflow 38. The constant liquid level ensures that an essentially constant hydrostatic pressure always prevails at the bottom part of the wire pit. The upper end of the wire pit 10 is further provided with a ceiling and a gas discharge conduit 39 therein, from where the gases separated from the wire waters are removed from the wire pit 10. Both a pipe 26 for thick stock and recirculation pipes 36 lead to the bottom part of the wire pit 10.

An essential problem of the couplings in accordance with FIGS. 6 and 7 is the elevation of the main process apparatuses, which are located at remarkably different levels, which requires plenty of space and long pipings.

Figure 1A:
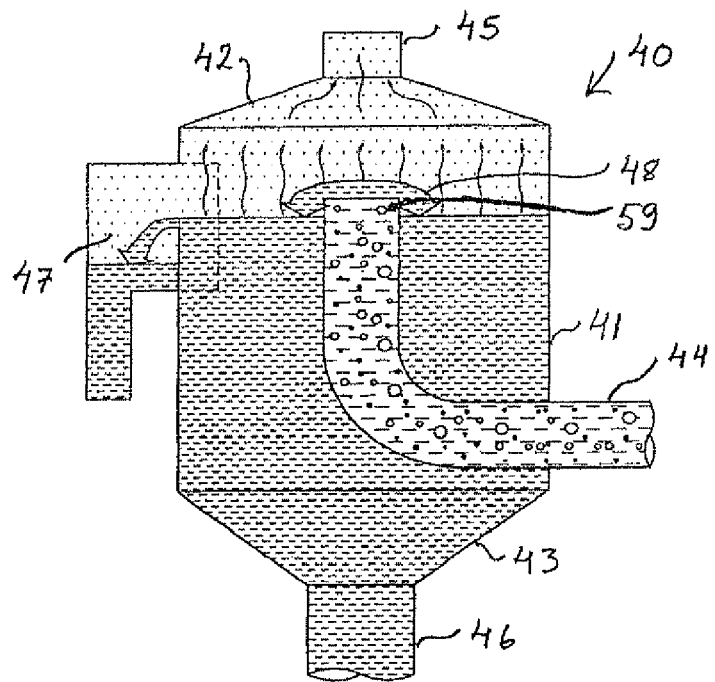

FIG. 1a illustrates in more detail a wire water deaeration (receiver) tank 40 according to the invention. The construction is based on a vertical cylindrical type of tank 41 with conical ends 42, 43. The main principle of the present invention is to collect the wire water and possibly former water into a deaeration tank 40, which is under vacuum. The water is lead from the paper machine via transition pipes into the receiver tank for deaeration. The number of the transition pipes is one or more depending on the flow rate. In the deaeration tank the transition pipe ends up into a feed pipe 44 typically having an elbow and an upward directed pipe head. The upper part of the tank is provided with conduits 45 into the vacuum device for generating a vacuum space above the liquid surface in the deaeration tank in the upper part of the tank and for removing the gas separated from the wire water. A discharge duct 46, a drop leg for discharging the deaerated wire water is connected to the bottom part of the deaeration tank, which bottom part is converging, preferably conically. Further the deaeration tank is preferably provided with an overflow 47 for regulating the liquid level.

In the deaeration principle according to the invention the wire water is not made to impinge for separating air. Therefore the feed into the deaeration apparatus in accordance with the invention is relatively calm, only an overflow 48 over the upper edge of the feed pipe's 44 discharge head 59. The upper edge of the feed pipe must be above the liquid level 49 in the deaeration tank and typically about 0.3-0.5 m lower than the level of the wire water inlet side, e.g. for example the water discharge port 50 (FIG. 1b) of a paper machine. By means of a feed pipe that extends above the liquid level, the water is forced in the deaeration apparatus into the vacuum space above the liquid level in the deaeration tank for preventing the air bubbles from submerging in the liquid and for ensuring deaeration before the water falls onto the liquid surface.

Figure 1B:
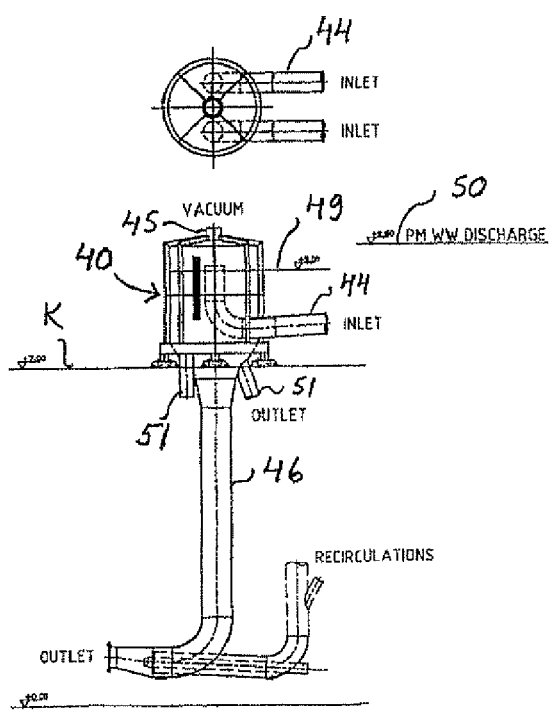

FIG. 1b also illustrates top and side views of an embodiment, where the number of feed pipes 44 is more than 1, i.e. 2. Also a greater number 4, 6 etc. may be required. The number of the transition pipes depends on the wire water flow rate. As the figure shows, the upper end of the feed pipe is lower than the feed point of the wire water, i.e. typically the wire water discharge port of the paper machine. The discharge duct of the deaeration tank, the drop leg, typically extends to the basement level of the building. In addition to the discharge duct 46, there can be several discharge conduits 51, e.g. a discharge conduit for the overflow 47 and a headbox dilution water conduit.

Figure 2:
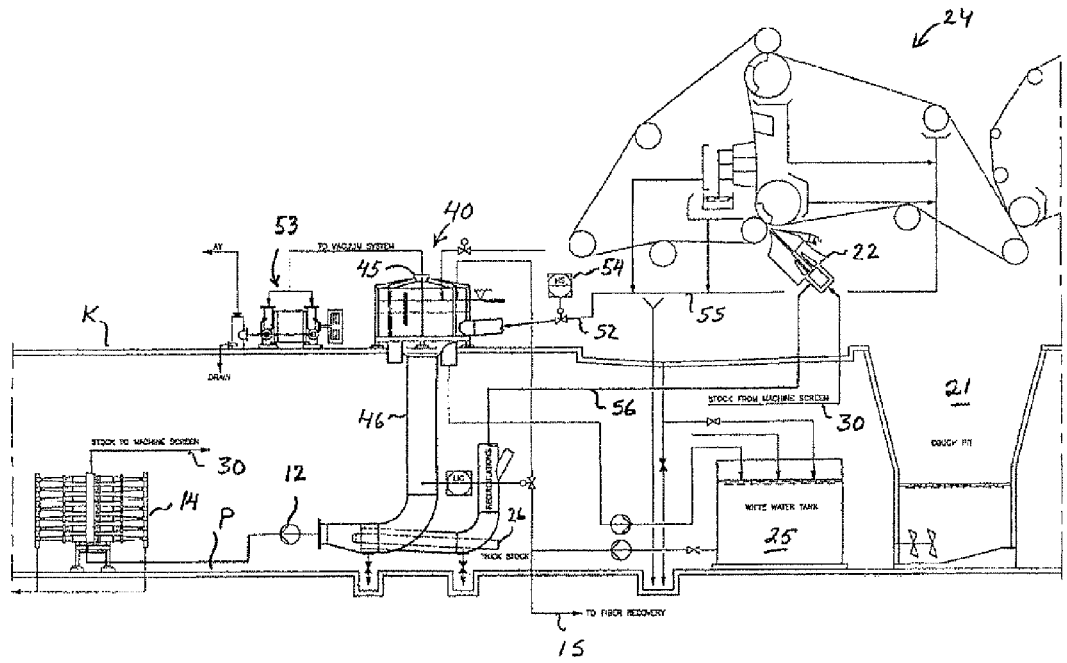
FIG. 2 illustrates an embodiment of the invention, wherein the wire water deaeration tank is connected directly to a paper machine.

FIG. 2 illustrates how the deaeration tank 40 for wire water deaeration in accordance with FIG. 1 can be applied in a new paper machine approach system. The tank 40 itself is located at the machine level K. The deaeration tank is connected directly to the wire water discharge port of the paper machine and no separate wire water silo or wire pit 10, as in FIG. 6, is needed. The wire water is introduced from the wire section of the paper machine via one or more transition pipes 52 into the tank, whereby the transition pipe continues as a feed pipe 44 entering the tank in a way presented in connection with FIG. 1. The transition pipes can be connected to the paper machine right at the wire water discharge port.

From the upper part of the deaeration tank 40 a conduit 45 leads to a vacuum device 53. One or more control valves 54 are arranged in the transition pipes between the formation point of water and the feed of the deaeration tank for controlling the liquid level at the discharge point 55 of the wire water at the paper machine.

The essentially gas-free wire water exits via a discharge duct 46 of the deaeration tank 40, which wire water receives thick stock 26 in the lower part of the discharge duct in a similar way as in a prior art wire pit. Also the headbox recirculation 56 is introduced into the bottom part of the drop leg, into the suction cone of the fan pump 12. The wire water dilutes, and the thin stock thus obtained is pumped by means of fan pump 12 preferably to centrifugal cleaners 14 and further via line 30 through a machine screen (not shown) into the headbox 22. The centrifugal cleaners 14 are located at the basement level.

In the known systems, FIGS. 6 and 7, a fan pump (12) is always required for a Deculator-type deaeration tank and a headbox fan pump (not shown in detail in FIGS. 6 and 7) after this deaeration tank prior to the machine screen. In the system according to the invention, such as in FIG. 2, the headbox dilution line only requires a single pump, because the wire water feed to the deaeration tank does not require a pump, but the water enters the deaeration tank by means of vacuum. Also, the main line does not require a second pump, if centrifugal cleaners are not used (many board machine applications). But when centrifugal cleaners are required in the main line, a secondary fan pump after the cleaners is necessary only when the combined pressure including cleaner accept counterpressure and cleaner nominal pressure difference exceeds the maximum feed pressure defined for the centrifugal cleaner.

Figure 3:
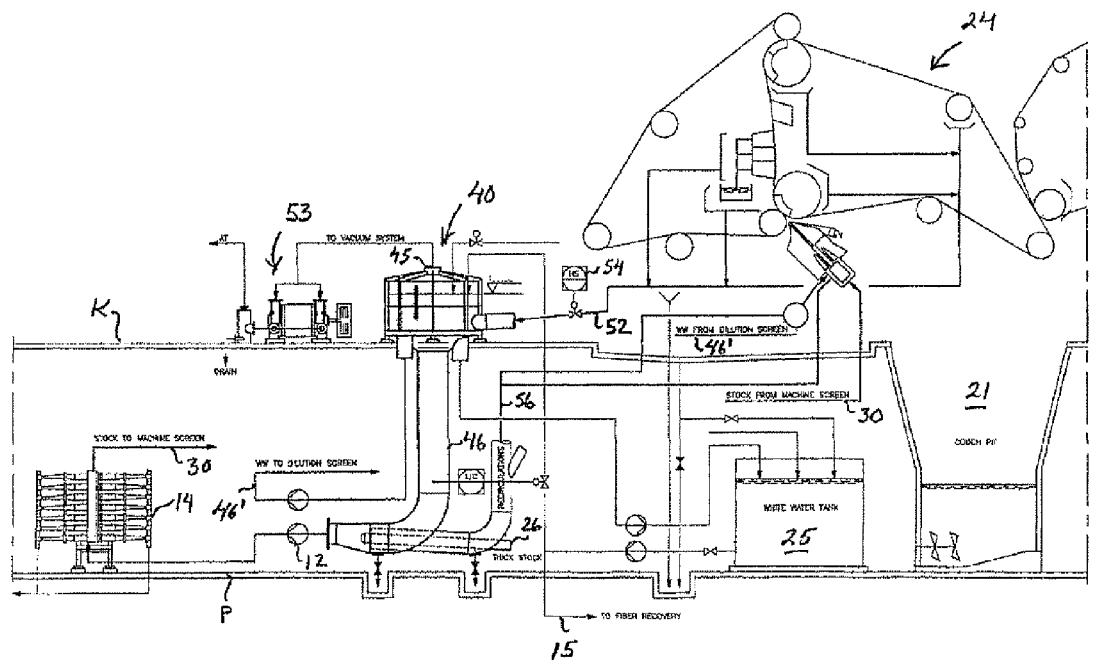
FIG. 3 illustrates an embodiment of the invention, wherein a wire water deaeration tank is connected directly to a paper machine, with consistency profiling dilution water loop connected thereto.

The arrangement shown in FIG. 3 corresponds to FIG. 2, except that a portion of the wire water, deaerated in the deaeration tank 40, is used as dilution water in the headbox for consistency profiling of the stock. The wire water is pumped into the headbox via pipe 46' through a screen (not shown).

Figure 4:
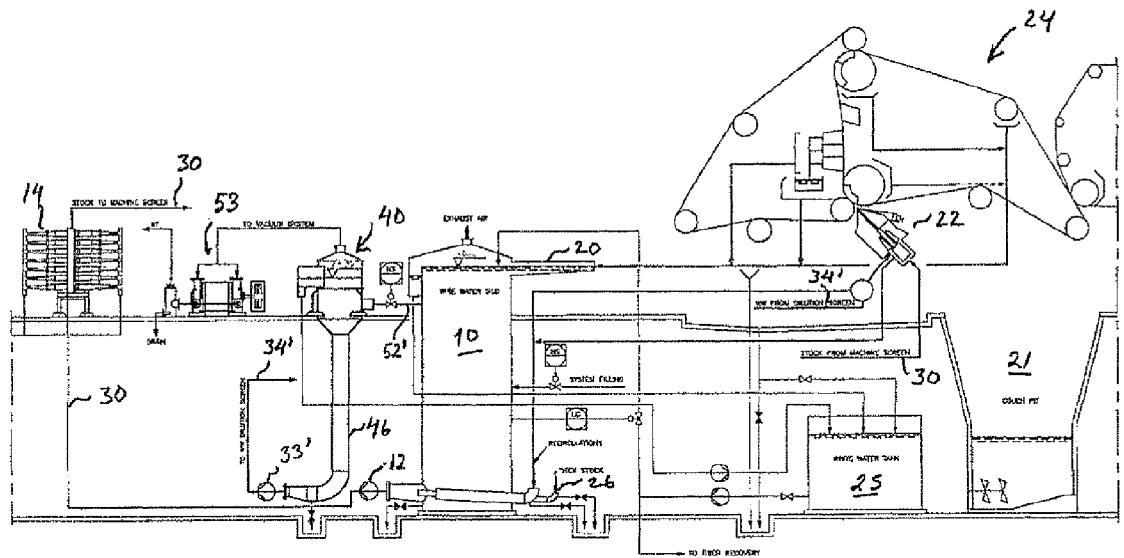
FIG. 4 illustrates an embodiment of the invention, wherein a wire water deaeration tank is connected to an existing wire pit.

FIG. 4 illustrates a wire water deaeration arrangement according to the invention connected to a wire water silo 10 known per se, which is described in connection with FIG. 6. From the paper machine the wire water is lead in a known way to the wire water silo 10, as presented in connection with FIG. 6. The wire pit 10 is connected via a transition pipe 52' or pipes to a wire water deaeration tank 40 according to the invention for deaeration. The liquid level in the wire pit is higher than the discharge opening of the deaeration tank feed pipe. By means of vacuum, wire water flows through a level regulation valve into the vacuum space of the deaeration tank 40, and the discharge pipe of said tank is connected directly to the dilution water mixing pump of the headbox. This essentially gas-free wire water is used as dilution water in the headbox for consistency profiling of the stock, whereto it is pumped through a screen. Therefore the wire water is pumped from the deaeration tank 40 drop leg 46 with a pump 33' via screening into the paper machine headbox 22 from line 34'.

This application does not require complete deaeration, but air is removed from the wire water only and not from the stock, which is taken from the wire water silo, i.e. wire pit 10 by means of pump 12 via a centrifugal cleaner plant 14 and a machine screen (not shown) into the headbox from line 30.

Figure 5:
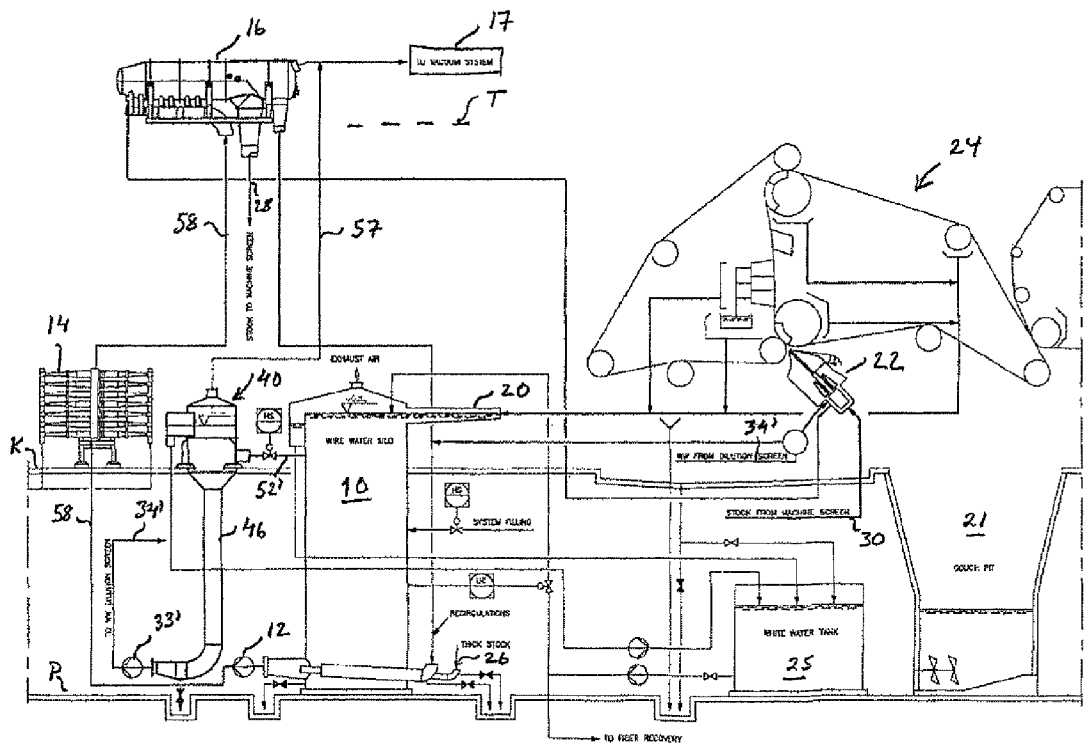
FIG. 5 illustrates an embodiment of the invention, wherein a wire water deaeration tank is connected to the wire water silo and which also comprises stock deaeration.

FIG. 5 illustrates a paper machine approach system comprising a wire water silo known per se, into which the wire water is lead from the paper machine via channel 20. The thick stock 26 is lead into the wire pit and further into a dilution feed pump 12. If needed, the thin stock is lead via line 58 through centrifugal cleaners 14 to a deaeration tank 16 located at a higher level T than the machine level for deaeration of the stock, as presented in connection with FIG. 6.

Additionally, air is removed from the wire water by taking it from the wire pit 10 in a method according to the invention via at least one transition pipe 52' into a deaeration tank 40. For generating vacuum, the deaeration tank 40 is now connected via line 57 into the same vacuum source as the deaeration tank 16 for the stock or it may also be connected to a separate vacuum device 53 shown in FIG. 2.

The deaerated wire water is pumped by means of a pump 33' from the deaeration tank 40 via a screen (not shown) and line 34' into the headbox 22, where it can be used for consistency profiling of the stock, which requires gas-free liquid for ensuring disturbance-free operation of the paper machine.

An advantage of the approach systems according to the invention, such as e.g. the embodiments illustrated in FIGS. 2-5, is that the air-removal from the wire water is carried out in a deaeration tank located essentially at the machine level, so that the space-requirement and pipings are essentially smaller than in prior art approach systems, such as e.g. in FIG. 6. The advantages of the invention become evident especially when only partial air-removal is required in the approach system.

Reference Numerals in the Figures

| Reference numeral | Description |
| --- | --- |
| 10 | Wire water silo, wire pit |
| 12 | Mixing pump |
| 14 | Centrifugal cleaners |
| 15 | Fiber recovery |
| 16, 16' | Deaeration tank |
| 17 | Vacuum devices |
| 20 | Wire water collection flume |
| 21 | Machine chest |
| 22 | Paper machine headbox |
| 24 | Paper machine |
| 25 | Paper machine white water tank |
| 26 | Fiber material |
| 27 | Wire water discharge from the paper machine |
| 28 | Stock flow to the machine screen |
| 30 | Stock flow from the machine screen |
| 32 | Wire water to the deaeration tank |
| 33 | Wire water pump |
| 34, 34' | Wire water to the dilution screen |
| 36 | Circulation water |
| 38 | Overflow of wire pit |
| 39 | Gas-discharge conduit from the wire pit |
| 40 | Wire water deaeration tank |
| 41, 42, 43 | Cylinder and ends of the wire water deaeration tank's cylinder |
| 44 | Feed pipe |
| 45 | Conduit to the vacuum device |
| 46, 46' | Discharge duct for wire water, from which air has been removed |
| 47 | Overflow |
| 48 | Flow from the feed pipe |
| 49 | Level in the deaeration tank |
| 50 | Level of the wire water discharge from the paper machine |
| 51 | Outlet conduit of the deaeration tank |
| 52, 52' | Transition pipe |
| 53 | Vacuum device |
| 54 | Control valve |
| 55 | Wire water discharge from the paper machine |
| 56 | Headbox recirculation flow |
| 57 | Conduit to the vacuum device |
| 58 | Thin stock line |
| 59 | Discharge edge of the feed pipe |

The invention claimed is:

1. An apparatus for deaeration of wire water in a web formation machine, said apparatus comprising:
a deaeration tank connected to a vacuum-generating device which forms a vacuum in a vacuum space in an interior of the deaeration tank;
at least one wire water feed pipe extending into the interior of said deaeration tank, connected to a wire water source and opening at a discharge end to the vacuum space above a liquid surface of wire water in the interior of the tank, and
a wire water discharge duct is connected to a bottom part of the tank, extends downward from the tank and is connected to a pump;
wherein the at least one wire water feed pipe extends into the interior space above the liquid surface of the wire water in the tank such that wire water flows from the discharge edge into the vacuum space and onto the liquid surface of the wire water, and
wherein a primary motive force moving the wire water through the at least one wire water feed pipe is due to a suction applied to the outlet of the feed pipe in the tank by the vacuum in the vacuum space.

2. An apparatus according to claim 1, wherein the deaeration tank is at an elevation of the web formation machine, and the pump is at a lower elevation than the elevation of the web formation machine.

3. An apparatus according to claim 1 wherein the at least one feed pipe is connected through a transition pipe to the wire water source, and an elevation of the transition pipe is higher than an elevation of the discharge end of the feed pipe.

4. An apparatus according to claim 1, wherein the deaeration tank comprises a cylindrical vessel having an upper part provided with a conduit to the vacuum-generating device and a conically converging bottom part connected to a wire water discharge duct.

5. An apparatus according to claim 4, wherein the upper part includes at least one of a conical or convex housing.

6. An apparatus according to claim 1 wherein a wire water overflow device in an upper region of the deaeration tank maintains the liquid surface of the wire water at a constant level in the tank.

7. A method according to claim 1 wherein that the at least one feed pipe includes at least two feed pipes.

8. An apparatus according to claim 1 further comprising a transition pipe connected to the at least one feed pipe, wherein the transition pipe is connected to a wire water outlet conduit of the wire water source in the web formation device and conveys the wire water directly to the deaeration tank without the presence of a mechanical pump in the transition pipe and the at least one feed pipe.

9. An apparatus according to claim 8 wherein the liquid level of the wire water source is higher than a discharge edge of the feed pipe in the deaeration tank.

10. An apparatus according claim 1, wherein the apparatus further comprises a wire pit receiving the wire water from the web formation machine and a transition pipe connected to the at least one feed pipe, which transition pipe is connected to the wire pit for conveying the wire water to the tank.

11. An apparatus according to claim 10, wherein a the liquid level is at the wire water surface in the wire pit discharge and is higher than a discharge edge of the feed pipe in the deaeration tank.

12. An apparatus according to claim 1 wherein the pump is connected to a headbox of the web formation machine for conveying the wire water to the headbox.

13. An apparatus according to claim 1 wherein the pump is a stock dilution pump.

14. An apparatus according to claim 4, wherein the wire water discharge duct includes a plurality of wire water discharge ducts.

15. An apparatus according to claim 8, wherein at least one control valve is provided in a transition pipe between the wire water source and the deaeration tank and the at least one control valve regulates the liquid level in the wire water source.

16. An apparatus according to claim 10, wherein at least one valve is provided in the transition pipe and regulates an elevation of the wire water surface in the deaeration tank.

17. An apparatus according to claim 1 wherein the deaeration tank has a wire water capacity sufficient to achieve a wire water retention time in the tank to provide a predetermined deaeration of the wire water in the tank.

* * * * *